United States Patent [19]

Dennis

[11] Patent Number: 4,508,466
[45] Date of Patent: Apr. 2, 1985

[54] LOCKABLE TELESCOPIC JOINT

[76] Inventor: Victor S. Dennis, 13342 Mango Dr., Del Mar, Calif. 92014

[21] Appl. No.: 464,626

[22] Filed: Feb. 7, 1983

[51] Int. Cl.³ .............................................. F16B 7/10
[52] U.S. Cl. .................................. 403/104; 403/165; 403/342; 285/340
[58] Field of Search .............. 403/104, 342, 165, 326; 285/340, 341; 248/411, 412

[56] References Cited

U.S. PATENT DOCUMENTS

| | | | |
|---|---|---|---|
| 1,781,222 | 11/1930 | Fischer | 285/340 |
| 1,903,926 | 4/1933 | Lamont | 285/340 |
| 2,064,140 | 12/1936 | Appleton | 285/340 |
| 2,100,796 | 11/1937 | Church | 285/340 |
| 2,187,880 | 1/1940 | Kaysing | 285/341 X |
| 3,338,607 | 8/1967 | Broadhurst, Jr. | 403/342 |

FOREIGN PATENT DOCUMENTS 1289543  2/1962  France ................................ 403/104

Primary Examiner—Andrew V. Kundrat
Attorney, Agent, or Firm—Charmasson & Holz

[57] ABSTRACT

A lockable telescopic joint is provided wherein two telescopic members may be fixed against telescoping action by tightening a glade nut, and yet after tightening there remains a substantial degree of rotational freedom so that one telescoping member may be rotated relative to the other by hand, and yet the members will not telescopically collapse short of applying considerably more compressive force than need be exerted to rotate the members.

2 Claims, 5 Drawing Figures

LOCKABLE TELESCOPIC JOINT

BACKGROUND OF THE INVENTION

The invention is in the field of telescopic joints or support braces wherein a telescopic action is desired to make length adjustments, and when the appropriate length is reached, one of the telescoping tubes can be tightened down at the joint relative to the other.

Although numerous such devices exist, such as for camera tripods and other applications where a lightweight, telescoping leg or support is needed, the inventor had a rather specialized need in the construction of telescoping braces for solar panels. It became necessary to utilize braces that were not only capable of being set at a fixed length, but also, for convenience of installation, that once the length had been established, rotation between the members was still possible.

The amount of rotational freedom required would not be enough to require complicated ball bearing joints, of which no doubt many could be found. Rather, the two tubes needed to be rotatably adjustable by the application of force delivered by hand, such that the tubes, although rotational were still under substantial rotational friction and would not rotate back or shift from the position in which they had been set.

SUMMARY OF THE INVENTION

The device produced by the inventor to meet this need comprises inner and outer telescoping tubes, the outer tube being threaded to accommodate a gland nut which defines around the inner tube an annular bearing space and a bearing seat. The end of the larger pipe has a ramp which corresponds to a ramp on the far side of the bearing seat such that when the gland nut is tightened down on the outer member these ramps tighten against an inner annular bearing element which is C-shaped in cross section, so that the edges of the C dig into the surface of the inner pipe. Because the outer surface of the C rides on the bearing seat, and the bearing element is captured in the gland nut so that there is no possibility of it moving relative to the outer tube other than rotationally. The inner tube is purchased by the sharp edges of the bearing element, and depending on how tight the gland that is tightened down, will either not permit longitudinal movement at all of the inner tube relative to the bearing, or will permit such motion only under high levels of compression or extension forces.

DETAILED DESCRIPTION OF THE PREFERRED EMBODIMENT

Figure 1:
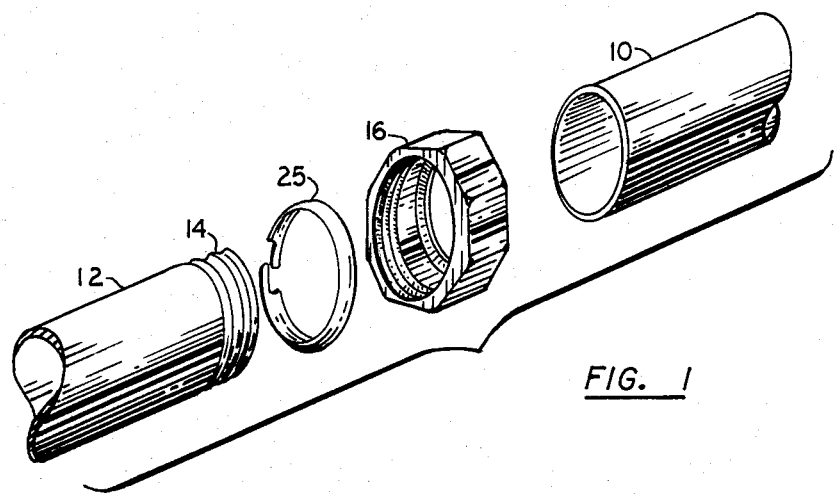
FIG. 1 is an exploded perspective view of the joint.

The joint consists of an inner tube 10 which slideably seats inside the outer tube 12, the latter of which has a threaded end 14 which engages a gland nut 16 similar to a packing gland. The gland has a relieved interior to define a seating area 18 and a rear seating thread-free, smooth surface 20. Adjoining the surface 20 are first, a ramp 22 defined by an inturned lip of the gland nut and second, a ramp 24 defined by the outer tube.

Figure 2:
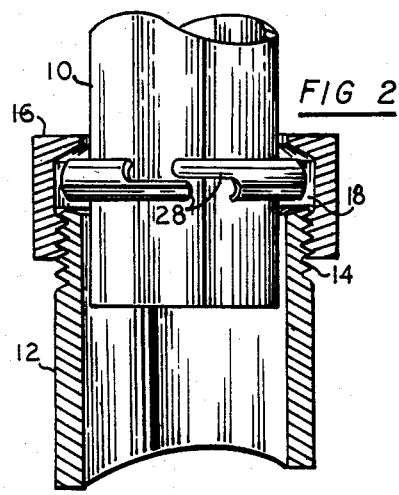
FIG. 2 is an elevation view of the inner tube and the bearing ring and a section view through the gland nut and other tube.
Figure 3:
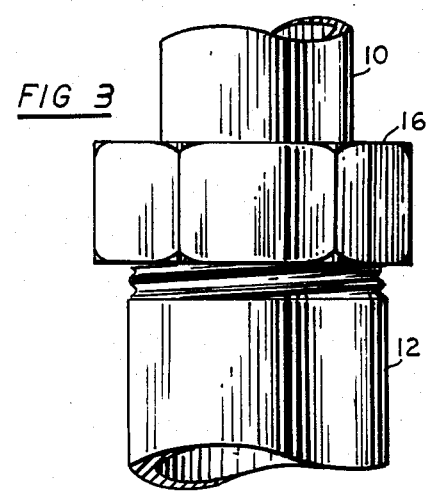
FIG. 3 is an elevation view of the completed assembly.
Figure 4:
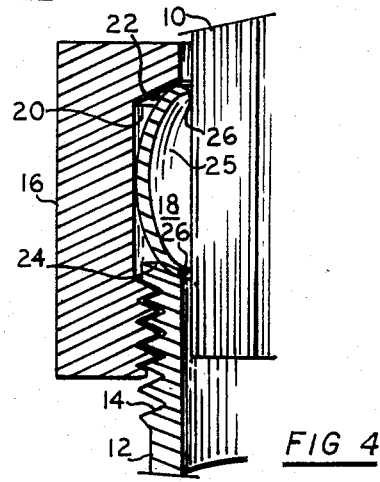
FIG. 4 is a section taken longitudinally through a typical portion of the joint illustrating the joint prior to compression.
Figure 5:
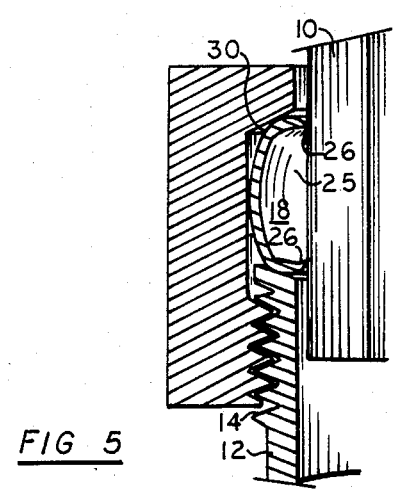
FIG. 5 is the same section as FIG. 4, but taken after the joint has been tightened to actuate the gripping action of the bearing element.

Inside the seating space 18 is an annular bearing element 25 C-shaped in cross section as can best be seen in FIGS. 4 and 5, and defining sharp edges at the tips of the C as indicated at 26. The annular bearing is split as shown in FIGS. 1 and 2, with overlapping tabs 28 to define 360° continuity of the gripping action. The overlapping tabs of course permit the ring a certain range of contractive and expansive motion, which is required under the action of the joint.

As can be seen in FIG. 4, before the gland nut is tightened down onto the outer tube, there is space in the bearing seating space 18 for the bearing to seat without purchasing the inner tube to any significant degree, or any degree at all for that matter. When loose as shown in FIG. 4, there is no significant resistance to relative longitudinal motion between the two tubes.

However, as shown in FIG. 5, as the gland nut is tightened down onto the outer tube, the ramps 22 and 24 in effect close in on the rims of the convex rear surface 30 of the bearing ring, which rise up on the ramps, longitudinally compressing the bearing ring slightly, (although tolerances are fairly close), causing the edges 26 of the bearing ring to dig into the inner tube as shown in FIG. 5.

The effect this has on the joint is to enable rotation to take place fairly easily by twisting with the hands, but offering a much greater resistance to longitudinal movement. It is believed that the bearing which is engaged into the surface of the inner tube 10 moves with this tube, although it would also be possible for the edges 26 to slide along the grooves they have made in the inner tube, with the bearing remaining stationary relative to the gland nut and outer tube. In any event, whatever happens within the nut, the resulting product is effective for its purpose and in great demand in the trade.

It is the essence of the invention that a joint be provided which offers significantly greater resistance to longitudinal motion than to rotational motion. It is also an object of this invention to provide such a joint which can be loosened to slide freely until the appropriate length is reached, so that it is doubly adjustable, with different adjustment styles. This could be done with slight modifications of the invention as shown, including non-annular cavities replacing the cavity 18 which nevertheless had elements such as the bearing ring.

While the preferred embodiment of the invention has been described, other modifications may be made thereto and other embodiments may be devised within the spirit of the invention and the scope of the appended claims.

What is claimed is:

1. A rotationally adjustable lock nut assembly for locking the end of an outer tube to a telescoping inner tube to resist relative axial movement between the tubes while allowing relative rotational movement, comprising:

a nut having means to secure itself on the end of said outer tube;

said nut having a relieved interior defining a thread-free, smooth seating surface and an annular seating space adjacent said inner tube;

said seating space having one side defined by an inturned lip of said nut and another side defined by the end of said outer tube;

an annular bearing having a C-shaped longitudinal cross-section seated in said seating space and defining two sharp axially spaced annular edges at the end of the C directed toward and gripping said inner tube, and an outer rounded bearing side tangentially contacting and sliding against said seating surface when said tubes mutually rotate.

2. Structure according to claim 1 wherein both of said seating space sides are inclined to define ramps on which the rims of said outer rounded bearing side rides to force said bearing edges into greater engagement with said inner tube as said nut is tightened, and the bearing is split with overlapping ends to provide a complete peripheral purchase of said inner tube.

* * * * *